(12) United States Patent
Jiang et al.

(10) Patent No.: US 11,829,394 B2
(45) Date of Patent: Nov. 28, 2023

(54) SOFT DELETION OF DATA IN SHARDED DATABASES

(71) Applicant: International Business Machines Corporation, Armonk, NY (US)

(72) Inventors: Peng Hui Jiang, Beijing (CN); Jun Su, Beijing (CN); Dong Chen, ChangPing District (CN); Huai Ying Hy Xia, Haidian District (CN); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 17/198,802

(22) Filed: Mar. 11, 2021

(65) Prior Publication Data
US 2022/0292120 A1 Sep. 15, 2022

(51) Int. Cl.
*G06F 16/00* (2019.01)
*G06F 16/31* (2019.01)
*G06F 16/27* (2019.01)
*G06F 16/16* (2019.01)
*G06F 16/33* (2019.01)

(52) U.S. Cl.
CPC .......... *G06F 16/328* (2019.01); *G06F 16/162* (2019.01); *G06F 16/27* (2019.01); *G06F 16/3331* (2019.01)

(58) Field of Classification Search
CPC ...... G06F 16/328; G06F 16/162; G06F 16/27; G06F 16/3331; G06F 16/215; G06F 16/2365
See application file for complete search history.

(56) References Cited

U.S. PATENT DOCUMENTS

| | | | | |
|---|---|---|---|---|
| 10,860,604 | B1* | 12/2020 | Pandey | G06F 11/1402 |
| 10,924,587 | B1* | 2/2021 | Chaudhuri | G06F 16/214 |
| 11,308,058 | B1* | 4/2022 | Jiang | G06F 16/2264 |
| 2010/0017443 | A1 | 1/2010 | Xie et al. | |
| 2011/0282839 | A1 | 11/2011 | Paksoy et al. | |
| 2013/0007062 | A1* | 1/2013 | Dutta | G06F 16/215 |
| | | | | 707/E17.055 |

(Continued)

OTHER PUBLICATIONS

Gilburg, Soft-deletion is actually pretty hard, https://medium.com/galvanize/soft-deletion-is-actually-pretty-hard-cb434e24825c, Mar. 24, 2018.
Curwin et al., Soft delete for SQL server in Azure VM and SAP HANA in Azure VM workloads, MICROSOFT, https://docs.microsoft.com/en-us/azure/backup/soft-delete-sql-saphana-in-azure-vm, Apr. 27, 2020.

(Continued)

*Primary Examiner* — Alexander Khong
(74) *Attorney, Agent, or Firm* — Garg Law Firm, PLLC; Rakesh Garg; Rakesh Roy

(57) ABSTRACT

An embodiment includes receiving a request to delete a specified document from a primary shard of a sharded database. The embodiment also includes inserting a soft-deletion document to a soft-deletion shard, wherein the soft-deletion document identifies the specified document, which remains in the primary shard. The embodiment also includes receiving a query from a client application, wherein the specified document satisfies the query. The embodiment also includes blocking the specified document from being returned in response to the query while the soft-deletion document associated with the specified document remains in the soft-deletion shard.

20 Claims, 13 Drawing Sheets

(56) References Cited

U.S. PATENT DOCUMENTS

| | | | |
|---|---|---|---|
| 2014/0149794 A1* | 5/2014 | Shetty | G06F 16/951 |
| | | | 709/213 |
| 2017/0364558 A1* | 12/2017 | Thorne | G06F 16/2365 |
| 2018/0285369 A1 | 10/2018 | Lazier | |
| 2019/0121902 A1* | 4/2019 | Ryan | G06F 16/278 |
| 2019/0147064 A1* | 5/2019 | Wee | G06F 16/162 |
| | | | 707/663 |
| 2020/0133550 A1 | 4/2020 | Willnauer | |
| 2020/0218738 A1 | 7/2020 | Beymer et al. | |
| 2021/0096957 A1* | 4/2021 | Rahman | G06F 11/1471 |
| 2021/0105331 A1* | 4/2021 | Deo | H04L 41/0893 |
| 2021/0149865 A1* | 5/2021 | Wu | G06F 16/2272 |
| 2022/0035556 A1* | 2/2022 | Cashman | G06F 12/10 |
| 2022/0129183 A1* | 4/2022 | Chitloor | G06F 3/0659 |

OTHER PUBLICATIONS

Smith, EF Core In depth—Soft deleting data with Global Query Filters, The Reformed Programmer, https://www.thereformedprogrammer.net/ef-core-in-depth-soft-deleting-data-with-global-query-filters/, Jul. 2, 2020.
Elastic, Delete API, https://www.elastic.co/guide/en/elasticsearch/reference/current/docs-delete.html, 2021.
Komyagin, Background Indexing on Secondaries and Orphaned Document Cleanup in MongoDB 2.6, https://www.mongodb.com/blog/post/background-indexing-on-secondaries-and-orphaned, Jan. 27, 2014.
Elastic, Requirements for leader indices, https://www.elastic.co/guide/en/elasticsearch/reference/6.8/ccr-requirements.html, 2021.
International Searching Authority, PCT/CN2022/074562, Apr. 28, 2022.

* cited by examiner

US 11,829,394 B2

SOFT DELETION OF DATA IN SHARDED DATABASES

BACKGROUND

The present invention relates generally to a method, system, and computer program product for sharded databases. More particularly, the present invention relates to a method, system, and computer program product for soft deletion of data in sharded databases.

Modern database systems provide rapid information storage, searching, and retrieval capabilities. However, the amount of digital content is growing at an exponential rate and requires substantial storage systems to store and manage the content. Thus, modern databases often interact with or are part of computer applications that collect, update, analyze, or report on large sets of data.

Where those data sets are so large, and the demand for access thereto is so high that performance or storage thresholds of a single server are reached, data can be distributed across multiple servers to provide additional performance and storage capabilities. Each segment in such a distributed database system is known as a "shard". Functions of the individual shards can be assigned according to a strategy designed to distribute user loads and optimize performance of the database system. Distributing or "sharding" a database in such a manner can overcome performance and storage limitations.

SUMMARY

The illustrative embodiments provide for soft deletion of data in sharded databases. An embodiment includes receiving a request to delete a specified document from a primary shard of a sharded database. The embodiment also includes inserting a soft-deletion document to a soft-deletion shard, wherein the soft-deletion document identifies the specified document, which remains in the primary shard. The embodiment also includes receiving a query from a client application, wherein the specified document satisfies the query. The embodiment also includes blocking the specified document from being returned in response to the query while the soft-deletion document associated with the specified document remains in the soft-deletion shard. Other embodiments of this aspect include corresponding computer systems, apparatus, and computer programs recorded on one or more computer storage devices, each configured to perform the actions of the embodiment. Such embodiments allow for soft deletion and restoration of the primary data without any write or delete actions on the primary shard and without any changes to the index for the primary shard, thus eliminating such time-consuming processes, resulting in significant performance improvements over previous soft deletion processes for NoSQL databases.

In another embodiment, the embodiment also includes receiving a restore request to restore the specified document to the sharded database and restoring, responsive to the restore request, the specified document to the sharded database, where the restoring includes removing the soft-deletion document from the soft-deletion shard. Thus, the embodiment allows for restoration of soft-deleted data responsive to a restore request, thereby providing expected functionality and avoiding costly data loss for end users who have become accustomed to having the capability to undo or undelete data.

In another embodiment, the embodiment also includes detecting that an amount of time since receiving the request to delete the specified document has reached a prescribed retention period and performing a hard deletion process for purging the specified document from the sharded database. Thus, the embodiment permits a period of time for restoring data, and permanently removes such data after the period of time to prevent unwanted data from consuming database resources.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
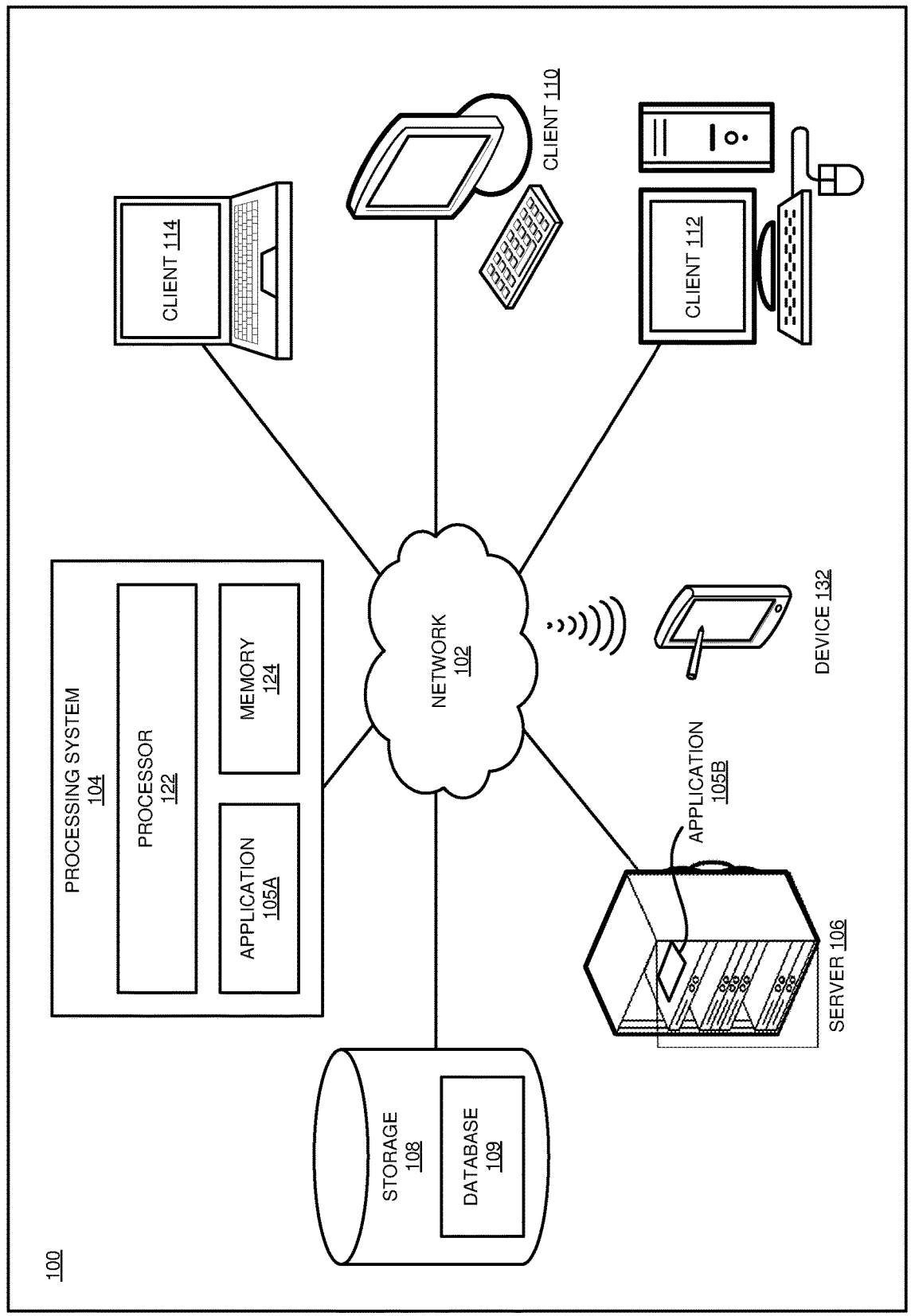
FIG. 1 depicts a block diagram of a network of data processing systems in which illustrative embodiments may be implemented.

Modern databases include cross platform document-oriented NoSQL (Not only Structured Query Language) databases. Such databases eschew the traditional table-based relational database structure in favor of sharding. When an actively growing database is running on a single server, it will eventually reach the limits of the computing resources that the server can provide. These limits include capacity limits for storing data as well as processing limits for handling queries and other database commands.

Sharding involves dividing the data into two or more subsets of data that are stored on separate servers. Such subsets of data are referred to herein as "primary shards" or "primary data shards." This distributed architecture can support deployments with very large datasets and high throughput operations. Thus, sharding helps in realizing scalable setups for storing large amounts of data in multiple primary shards on respective servers.

A sharded database may also include a data replication scheme, in which the database creates a copy set of each shard that holds the same data. At any point in time in a replica set, only one shard acts as the primary shard, all other replica shards are secondary shards. All write and read operations go to the primary shard and are then distributed evenly (if needed) to the other secondary shards in the set.

Despite the advantages sharding provides in terms of scalability, a problem exists in that adding or deleting data from a primary shard is a relatively time-consuming process that negatively impacts database performance. When data is added to or deleted from a primary shard, a primary index must be rebuilt to update the index records to reflect the change. Indexes are used to access databases, and a large database may require several large indexes that need to be maintained to access the database efficiently. Indexes usually need to be maintained or updated when a database is changed. Such re-indexing can take a long time and makes the index unavailable for queries until the index update is completed.

This problem is compounded by past attempts to implement soft deletion processes in sharded databases. When data is soft deleted, the data is not available to be selected or used, but can be restored using ordinary and available functionality of the database or the server. In contrast, without soft deletion, data will always be hard deleted, meaning that the data is permanently gone and cannot be restored without extraordinary efforts that may or may not be effective.

Data loss can be very costly and frustrating for an end user who have become accustomed to having the capability to undo or undelete data. Therefore, implementation of soft delete functionality is important to prevent data loss and to provide users with expected functionality. However, implementation of soft delete functionality is a system-specific exercise that presents unique challenges on some types of systems that are not issues on other types of systems. For example, past efforts to implement soft delete functionality in a document-oriented NoSQL database have negatively impacted database performance. A reason for this is that past soft-deletion processes involved writing a flag or other such data to the primary shard to mark "soft deleted" data as unavailable, and when the "soft deleted" data is purged, both the "soft deleted" data and the flag are deleted; in addition, index update operations are performed on the shard indexes for each of these write and delete operations. However, write, delete, and index-update operations are costly for the database to perform in terms of time and processing. Thus, these past types of soft deletion techniques present a technical problem in that they require several additional operations that are costly and require an undesirable trade-off of diminished performance for the benefit of restorable data.

To address these technical problems, disclosed embodiments introduce an additional shard, referred to as a soft deletion shard (SDS), that stores soft-deletion documents (SDDs) that reference soft-deleted primary data. Unlike a secondary shard, which holds a replica of data from the primary shard regardless of the status of the primary shard data, the SDS only stores documents associated with primary shard documents that have been soft deleted and have not yet been purged. During this period, the referenced primary document remains in a primary shard unless and until it is purged, i.e., hard deleted. If the soft-deleted data is restored instead of purged, the restoration involves deleting the associated SDD from the SDS. This allows for soft deletion and restoration of the primary data without any write or delete actions on the primary shard and without any changes to the index for the primary shard. Eliminating these time-consuming processes results in significant performance improvements over previous soft deletion processes for NoSQL databases.

An illustrative embodiment of a sharded database application with soft deletion receives a request to delete a specified document from a primary shard of a sharded database and, in response, inserts an SDD that identifies the specified document in an SDS, leaving the specified document in the primary shard. Thereafter, if the application receives a query from a client application such that the specified document satisfies the query, the application blocks the specified document from being returned with the query results so long as the SDD associated with the specified document remains in the SDS.

In an illustrative embodiment, the database application performs operations on a NoSQL database. Embodiments include any of a wide range of technologies and architectures that encompass NoSQL. For example, in some embodiments, the NoSQL database is a document-oriented database, or document store, that stores data in the form of documents, where each document has a unique identifier (UID), some kind of metadata that provides a degree of structure to the data, which may be formatted according to any of a variety of known data formats. and the document data is stored in any desired format. In some embodiments, multiple database servers collectively provide a service of a NoSQL database. Thus, in some embodiments, a NoSQL database includes a non-relational and largely distributed database system that enables rapid, ad-hoc organization and analysis of extremely high-volume, disparate data types. In some embodiments, a NoSQL database includes a database referred to as a cloud database, a non-relational database, a Big Data database, and/or a myriad of other terms for NoSQL databases.

Embodiments of the SDD may refer to the specified document in any of a variety of different ways. For example, in some embodiments, the SDD identifies the specific document by including a unique identifier (UID) of the specified document. Alternatively, or additionally, in some embodiments, the SDD includes a pointer that refers to the specified document.

In some embodiments, if the application receives a query from a client application, the database application executes the query against the primary data shards and executes the query against the SDS. The application identifies that the query results from the primary shards will include a document that has been soft deleted by detecting that an SDD has been returned from the query against the SDS. The application can identify the document that has been soft deleted by evaluating the SDD. Each SDD identifies a unique soft-deleted document from the primary shards, so the application uses this information to locate the soft deleted document from among the query results returned from the primary shards. For example, in some embodiments, the SDD includes a UID of a soft-deleted document in the primary shards, and the application locates the soft deleted document from among the query results by locating the document among the query results that has the UID of the SDD returned from the query against the SDS. Once the application locates the soft deleted document in the query results, the application removes the soft deleted document from the query results. Since the query results do not include the soft deleted document from the primary shards, the query results appear as expected by excluding the soft deleted documents.

In an illustrative embodiment, the application builds an index or a plurality of SDS indexes to facilitate the queries to the SDS. In some embodiments, the indexing includes associating a key with the location of a corresponding SDD. In some embodiments, the database application builds one or more indexes for the primary shards.

There are many different types of indexes that might be used by the application depending on implementation-specific considerations. For example, for unstructured data or human language data, a full text index with language analyzers to transform text blobs into index entries may be used. For geospatial or geo-temporal data, one might index points, polygons, and other shapes in a multi-dimensional space. In some embodiments, the application builds one or more SDS indexes to match the number and type of indexes present for the primary shards. This allows queries to the SDS to be consistent with queries to the primary shards.

In an illustrative embodiment, when the application executes a query against the SDS, the application first checks the status of the SDS index(es) to determine whether the SDS indexing is complete or incomplete. If the application determines that the indexing of the SDS is complete, then the application executes the query of the SDS using the SDS index(es). Otherwise, if the application determines that the indexing of the SDS is incomplete, then the application executes the query of the SDS using a full table scan.

In an illustrative embodiment, once a document in the primary shards has been soft deleted, it remains soft deleted and available to be restored for a prescribed retention period. In some embodiments, this prescribed retention period is a period that is set by a user. The application periodically checks for soft deleted documents that have been soft deleted for an amount of time that is equal to or greater than the prescribed retention period. Once a soft deleted document has been soft deleted for the prescribed retention period, the application purges the soft-deleted document from the primary shards. In some embodiments, the application purges soft-deleted documents by performing a hard deletion process on the specified document from the sharded database. In some such embodiments, the hard deletion process includes deleting the specified document from the primary shard of the sharded database, followed by updating the index(es) of the primary shards, followed by updating the soft-deletion indexes of the SDS, followed by deleting the SDD that identifies the specified document.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
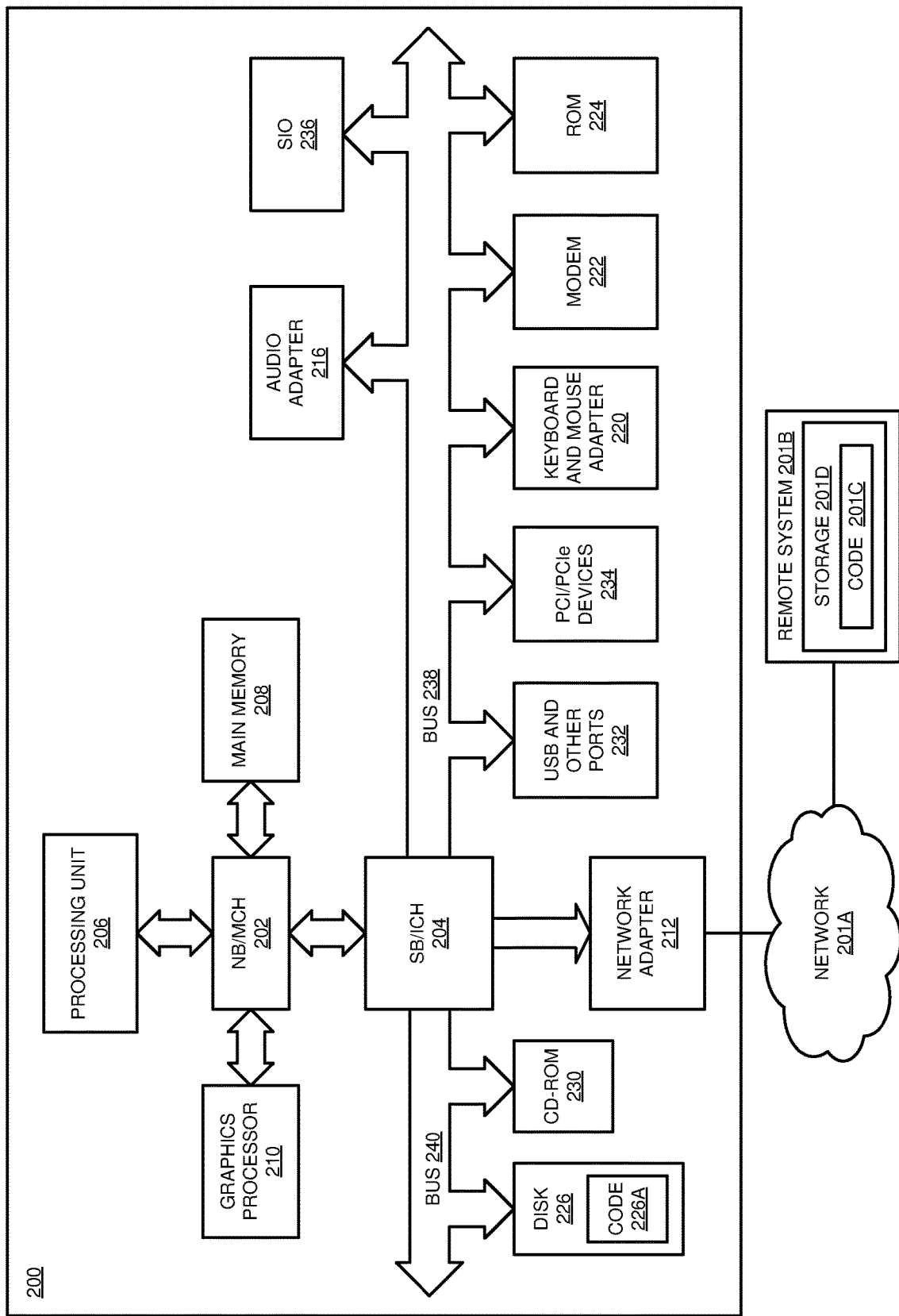
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation about the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes processing elements of a stream processing application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by stream processing application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
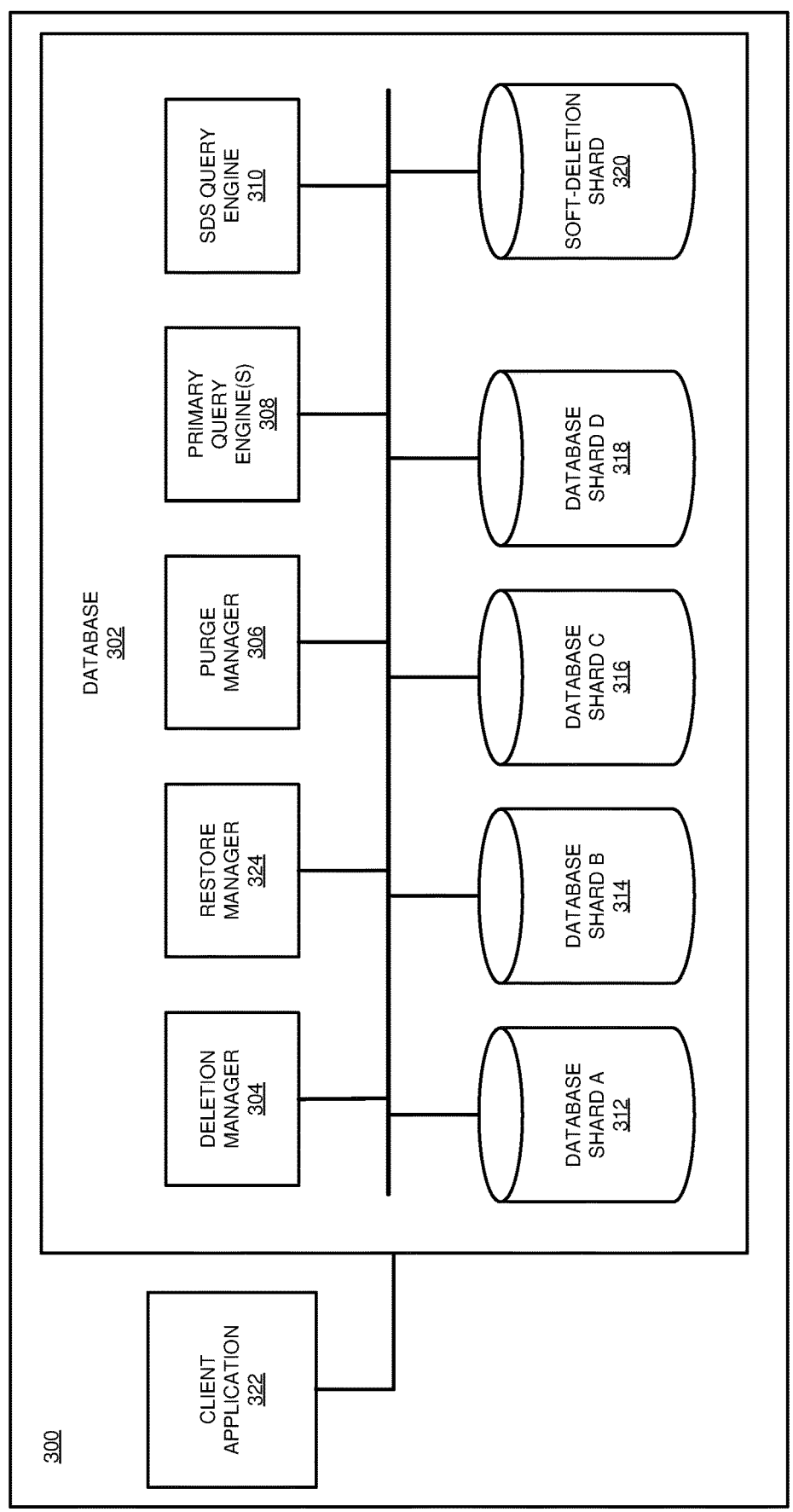
FIG. 3 depicts a block diagram of an example shard system in accordance with an illustrative embodiment.

With reference to FIG. 3, this figure depicts a block diagram of an example shard system 300 in accordance with an illustrative embodiment. In the illustrated embodiment, the shard system 300 includes a sharded database 302 in which one or more client applications 322 can access data items that have been distributed among multiple primary database shards 312, 314, 316, and 318. In an embodiment, the sharded database 302 is an example of database 109 of FIG. 1 and client application 322 is an example of application 105A/105B of FIG. 1.

Shard system 300 includes client application 322 and primary database shards 312, 314, 316, and 318. The quantities of client applications 322 and primary database shards 312, 314, 316, and 318 in system 300 can vary. In some embodiments, each of primary database shards 312, 314, 316, and 318 is a separate and independent database that does not need to be aware of any other shard within system 300. In some such embodiments, each of the primary database shards 312, 314, 316, and 318 includes a separate database server and relational database, for example. In some embodiments, there are two or more client applications 322 that are on separate computing systems that operate independently of each other of clients 322. In some such embodiments, each of the clients 322 executes a separate instance of a software program that utilizes a hash function in order to calculate, based on the primary key of a particular data item, the identity of a particular shard, among primary database shards 312, 314, 316, and 318, on which that particular data item either has been stored or is to be stored. In some embodiments, such data items are separate records possessing different values for similar attribute sets.

Generally, in order to perform an operation relative to a data item that already is stored on a particular one of primary database shards 312, 314, 316, and 318, a client application 322 executes one or more instructions relative to the data item by issuing database commands to the database 302. For example, such instructions can include a query command handled by one or more primary query engines 308 or a delete command handled by a deletion manager 304. In some embodiments, the database 302 includes a primary query engine 308 for each primary database shard 312-318. Illustrative embodiments also allow for a restore command handled by a restore manager 324 that allows deleted data to be restored within a designated period of time from which the data was deleted.

According to an embodiment of the invention, the database 302 is capable of restoring deleted data because a soft-deletion shard (SDS) 320 is included in the system 300 and stores soft-deletion documents that accommodate a soft deletion status for documents deleted from the primary database shards 312, 314, 316, and 318. After the designated period of time, the soft-deletion documents are removed from the SDS 320 by a purge manager 306 as part of a hard deletion process for purging the deleted data. During the designated period of time, an SDS query engine 310 performs a query of the SDS 320 corresponding to each query of the primary database shards 312, 314, 316, and 318 performed by the primary query engine(s) 308. If the SDS query engine 310 finds a document in the SDS 320, since the same query is performed against both the collection of primary database shards 312, 314, 316, and 318 and the SDS 320, and since the documents in the SDS 320 are essentially copies of, or references to, documents from the primary database shards 312, 314, 316, and 318 that have be soft deleted, this means that if a query matches a document from the SDS 320, then the same query will also match a document from the primary database shards 312, 314, 316, and 318 that has been soft deleted. Therefore, database 302 removes, from among the primary-shard query results, a query result identified by the SDS 320 document that was returned as a query result. This action removes the soft-deleted document from the search results since the deleted document would not be expected to be included in the query results.

Figure 4:
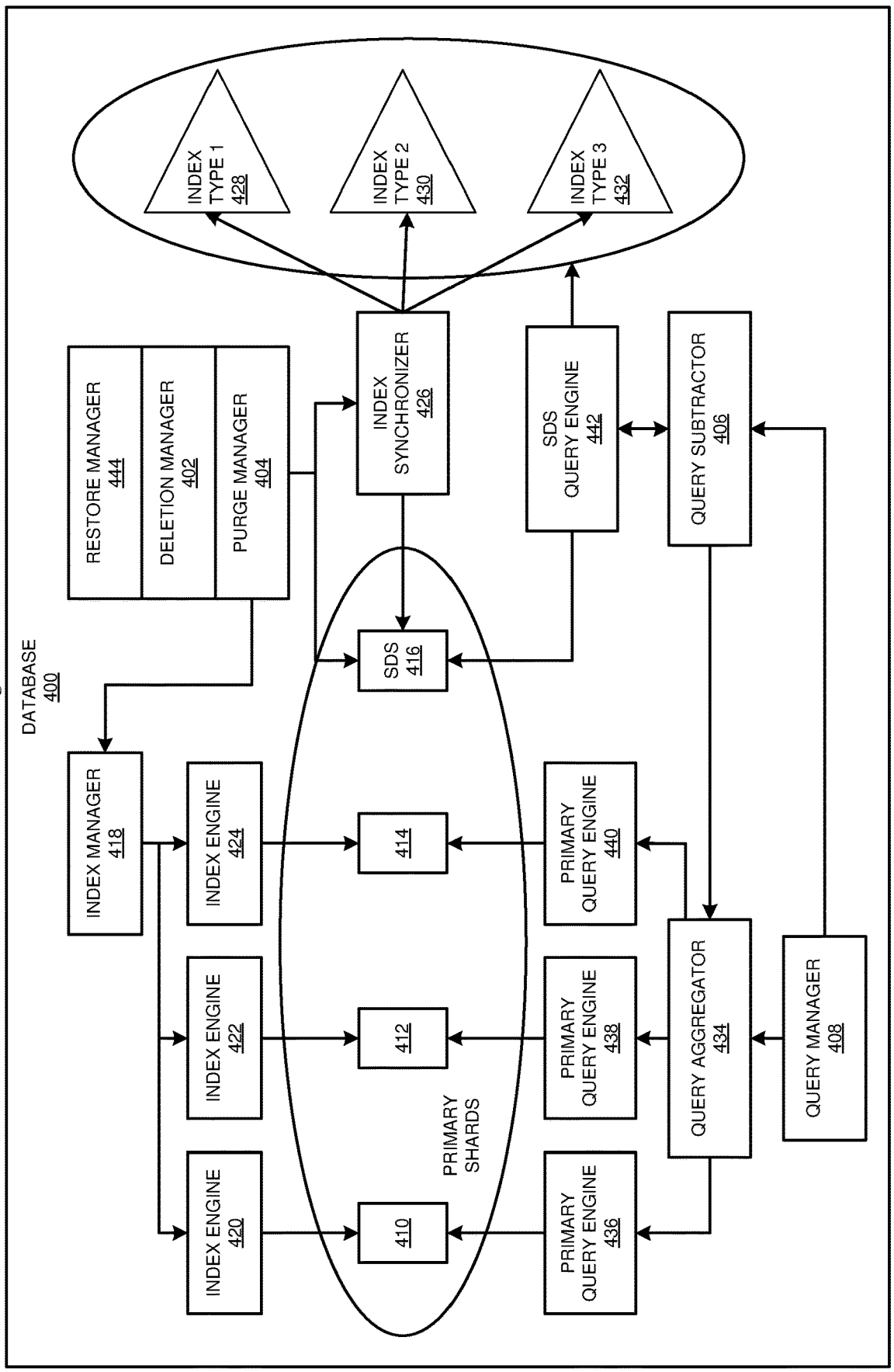
FIG. 4 depicts a block diagram of a sharded database in accordance with an illustrative embodiment.

With reference to FIG. 4, this figure depicts a block diagram of a sharded database 400 in accordance with an illustrative embodiment. In an embodiment, the sharded database 400 is an example of database 302 of FIG. 3 or database 109 of FIG. 1.

In the illustrated embodiment, the database 400 includes a deletion manager 402, a purge manager 404, a query subtractor 406, a query manager 408, primary database shards 410, 412, and 414, SDS 416, index manager 418, index engines 420, 422, and 424, index synchronizer 426, SDS indexes 428, 430, and 432, query aggregator 434, primary query engines 436, 438, and 440, SDS query engine 442, and restore manager 444. In some embodiments, the functionality described herein is distributed among a plurality of systems, which can include combinations of software and/or hardware-based systems, for example Application-Specific Integrated Circuits (ASICs), computer programs, or smart phone applications. In an embodiment, the deletion manager 402 is an example of deletion manager 304, the purge manager 404 is an example of purge manager 306, the primary database shards 410, 412, and 414 are examples of primary database shards 312, 314, 316, and 318, the SDS 416 is an example of SDS 320, the primary query engines 436, 438, and 440 are examples of primary query engine(s) 308, the SDS query engine 442 is an example of SDS query engine 310, and the restore manager 444 is an example of restore manager 324.

In the illustrated embodiment, the index manager 418 dispatches index requests to different primary shards 410, 412, and 414 by calling respective index engines 420, 422, and 424. The index engines 420, 422, and 424 perform index requests. While one index engine 420, 422, and 424 is shown for each primary shard 410, 412, and 414, alternative embodiments include multiple index engines for each primary shard. In some such embodiments, the database 400 builds one or more indexes for the primary shards 410, 412, and 414. There are many different types of indexes that might be used by the application depending on implementation-specific considerations. For example, for unstructured data or human language data, a full text index with language analyzers to transform text blobs into index entries may be used. For geospatial or geo-temporal data, one might index points, polygons, and other shapes in a multi-dimensional space. In some such embodiments, the database 400 includes different types of index engines for respective index types.

In some embodiments, an index synchronizer 426 asynchronously builds and updates one or more SDS indexes 428, 430, and 432 for the SDS 416 to match the number and type of indexes present for each of the primary shards 410, 412, and 414. This allows queries to the SDS 416 to be consistent with queries to the primary shards 410, 412, and 414.

In some embodiments, if the query manager 408 receives a query from a client application, the query manager 408 instructs the primary query engines 436, 438, and 440 to execute the query against the primary data shards 410, 412, and 414, and also instructs the SDS query engine 442 to execute the query against the SDS 416. The query aggregator 434 receives the query results from each of the primary query engines 436, 438, and 440 and performs result aggregation to combine the results into an aggregated result set.

The query subtractor 406 receives any query results found by the SDS query engine 442. The query subtractor 406 recognizes that the aggregated result set from the primary shards 410, 412, and 414 will include a document that has been soft deleted by detecting that an SDD has been returned from the query against the SDS 416. The query subtractor 406 is able to identify the document that has been soft deleted from among the documents in the aggregated result set by evaluating the SDD. Each SDD identifies a unique soft-deleted document from the primary shards 410, 412, and 414, so the query subtractor 406 uses this information to locate the soft deleted document from among the aggregated result set.

For example, in some embodiments, the SDD includes a UID of a soft-deleted document in the primary shards 410, 412, and 414, and the query subtractor 406 locates the soft deleted document from among the aggregated result set by locating the document among the query results that has the UID of the SDD returned from the query against the SDS 416. Once the query subtractor 406 locates the soft deleted document in the query results, the query subtractor 406 removes the soft deleted document from the query result set. Since the query result set does not include the soft deleted document from the primary shards 410, 412, and 414, the query result set appears as expected by excluding the soft deleted documents. Purge Manager: perform hard-deletion against primary data and indexes in primary shards and soft-deletion shard In an illustrative embodiment, once a document in the primary shards 410, 412, and 414 has been soft deleted, it remains soft deleted and available to be restored by the restore manager 444 for a prescribed retention period. In some embodiments, this prescribed retention period is a period of time that is set by a user. The application periodically checks for soft deleted documents that have been soft deleted for an amount of time that is equal to or greater than the prescribed retention period. Once a soft deleted document has been soft deleted for the prescribed retention period, the purge manager 404 purges the soft-deleted document from the primary shards 410, 412, and 414. In some embodiments, the purge manager 404 purges soft-deleted documents by performing a hard deletion process on the specified document from the sharded database 400. In some such embodiments, the hard deletion process includes deleting the specified document from the primary shard 410, 412, or 414 of the sharded database 400, followed by updating the index(es) by the index engines 420, 422, and 424 of the primary shards 410, 412, and 414, followed by updating the soft-deletion indexes 428, 430, and 432 of the SDS 416, followed by deleting the SDD that identifies the specified document.

Figure 5:
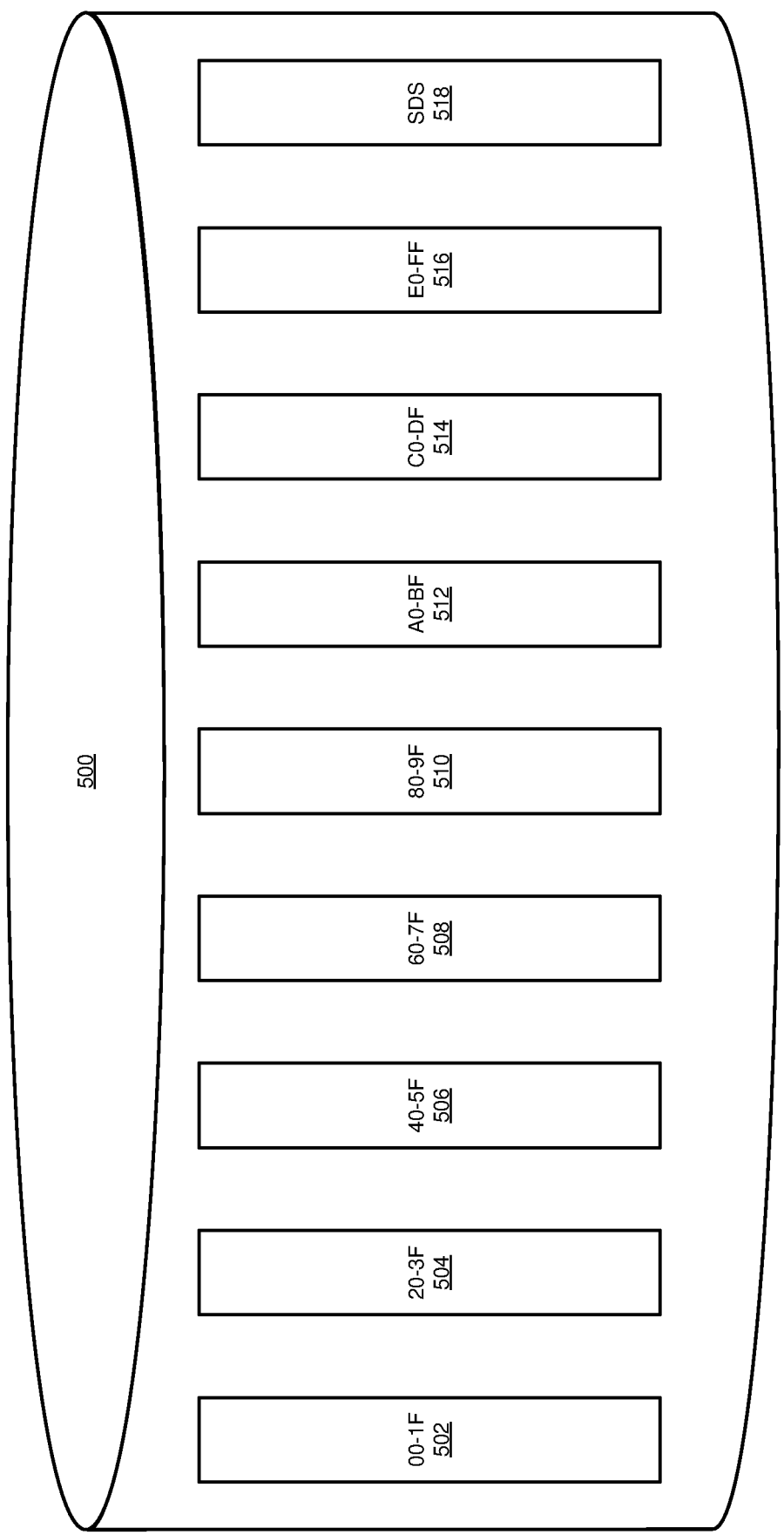
FIG. 5 depicts a block diagram of a sharded database in accordance with an illustrative embodiment.

With reference to FIG. 5, this figure depicts a block diagram of a sharded database 500 in accordance with an illustrative embodiment. In an embodiment, the sharded database 500 is an example of sharded database 400 of FIG. 4, database 302 of FIG. 3, or database 109 of FIG. 1.

In the illustrated embodiment, the database 500 includes primary shards 502-516 and SDS 518. The primary shards 502-516 each include an equal number of addressable data stores. In the illustrated embodiment, each of the primary shards 502-516 include 0x1F addresses, however this amount may vary. It is desirable to maintain balance in terms of data distribution across the primary data shards 502-516. One reason for this is that if the shards become unbalanced (e.g., primary shard 502 near capacity and primary shard 504 near empty), RAM and disk space is underutilized on one primary shard and over utilized on another. Some embodiments try to keep primary indexes in RAM along with recently used data to speed up performance. In an unbalanced situation, the RAM for the overloaded shard will start to evict data set items or even indices out of RAM. Therefore, it is desirable to maintain balanced data levels among the primary shards 502-516.

On the other hand, the SDS 518 stores data under unique circumstances (only soft-deleted data). Therefore, in some embodiments, the database 500 includes shard balancing to distribute data evenly across the primary shards 502-516, but excludes the SDS 518 from the balancing. Similarly, in some embodiments, the shards 502-516 include both primary and secondary data shards (e.g., where secondary shards are used for data replication). In some such embodiments, shard balancing is performed to distribute data evenly across the primary and secondary shards 502-516, but excludes the SDS 518 from the shard balancing.

Figure 6:
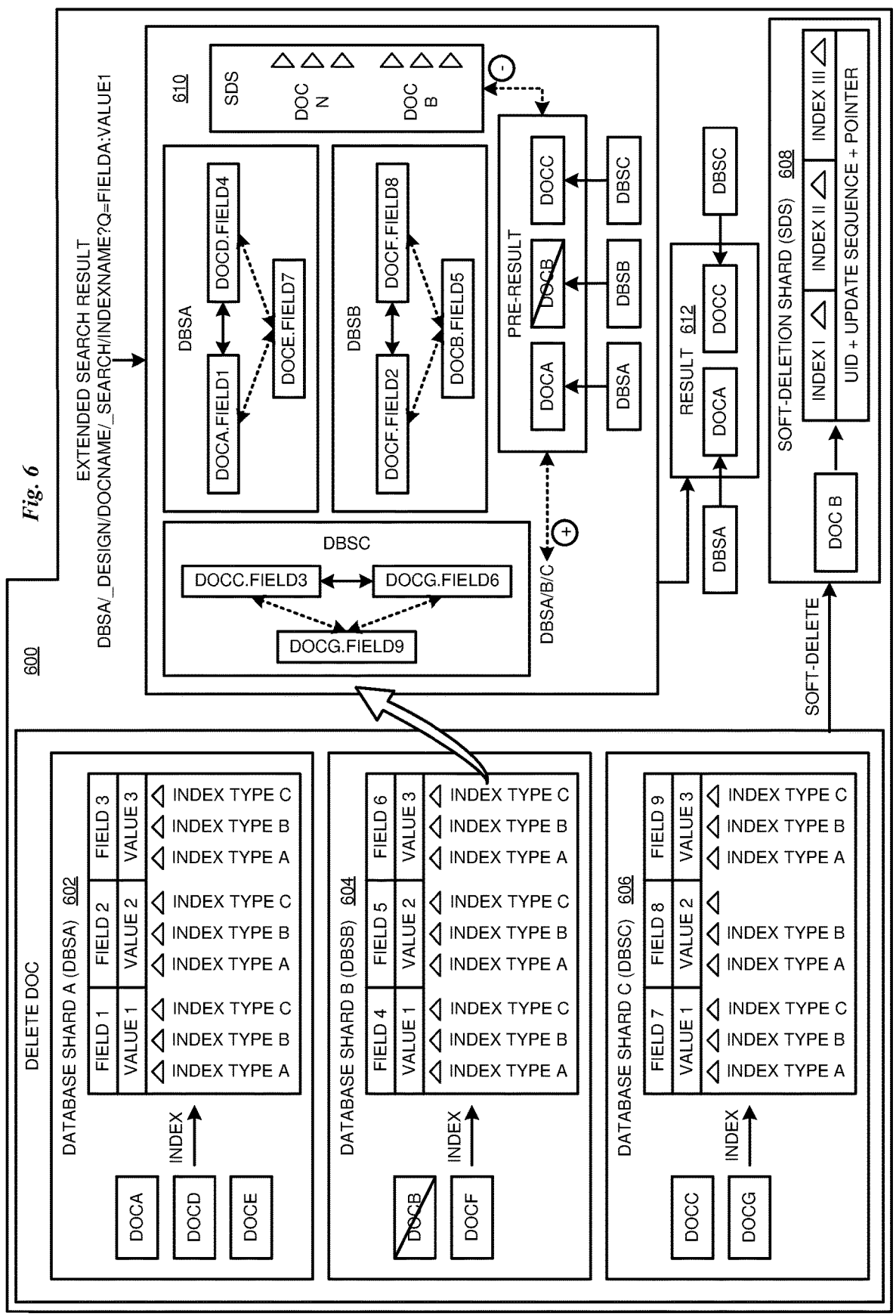
FIG. 6 depicts a block diagram of an example sharded database in accordance with an illustrative embodiment.

With reference to FIG. 6, this figure depicts a block diagram of an example sharded database 600 in accordance with an illustrative embodiment. More specifically, FIG. 6 shows the effect of a delete command for a document (DOCB) in the sharded database 600. In a particular embodiment, sharded database 600 is an example of sharded database 500 of FIG. 5, sharded database 400 of FIG. 4, database 302 of FIG. 3, or database 109 of FIG. 1.

In the illustrated embodiment, the sharded database 600 includes three primary shards: database shard A (DBSA) 602, database shard B (DBSB) 604, and database shard C (DBSC) 606. The sharded database 600 receives a delete command to delete DOCB in DBSB 604. This is indicated in FIG. 6 by showing the document DOCB with a strikethrough, indicating that DOCB has been soft deleted as a result of the delete command. However, the strikethrough of DOCB in DBSB 604 is only symbolic and for explanatory purposes, as the actual document DOCB in the DBSB 604 is not changed by a delete or restore command. Also, as a result of the delete command, an SDD for DOCB is added to the SDS 608. Next, the SDS indexes are updated to reflect the SDD for DOCB being added to the SDS 608. While DOCB is in a soft-deleted state, if the query manager 610 receives a query satisfied by DOCB, the DOCB is returned as a query result with other query results. However, since there is an SDD for DOCB in the SDS 608, the DOCB is removed while still in the pre-results. Thus, the final results 612 exclude the soft deleted document DOCB.

Figure 7:
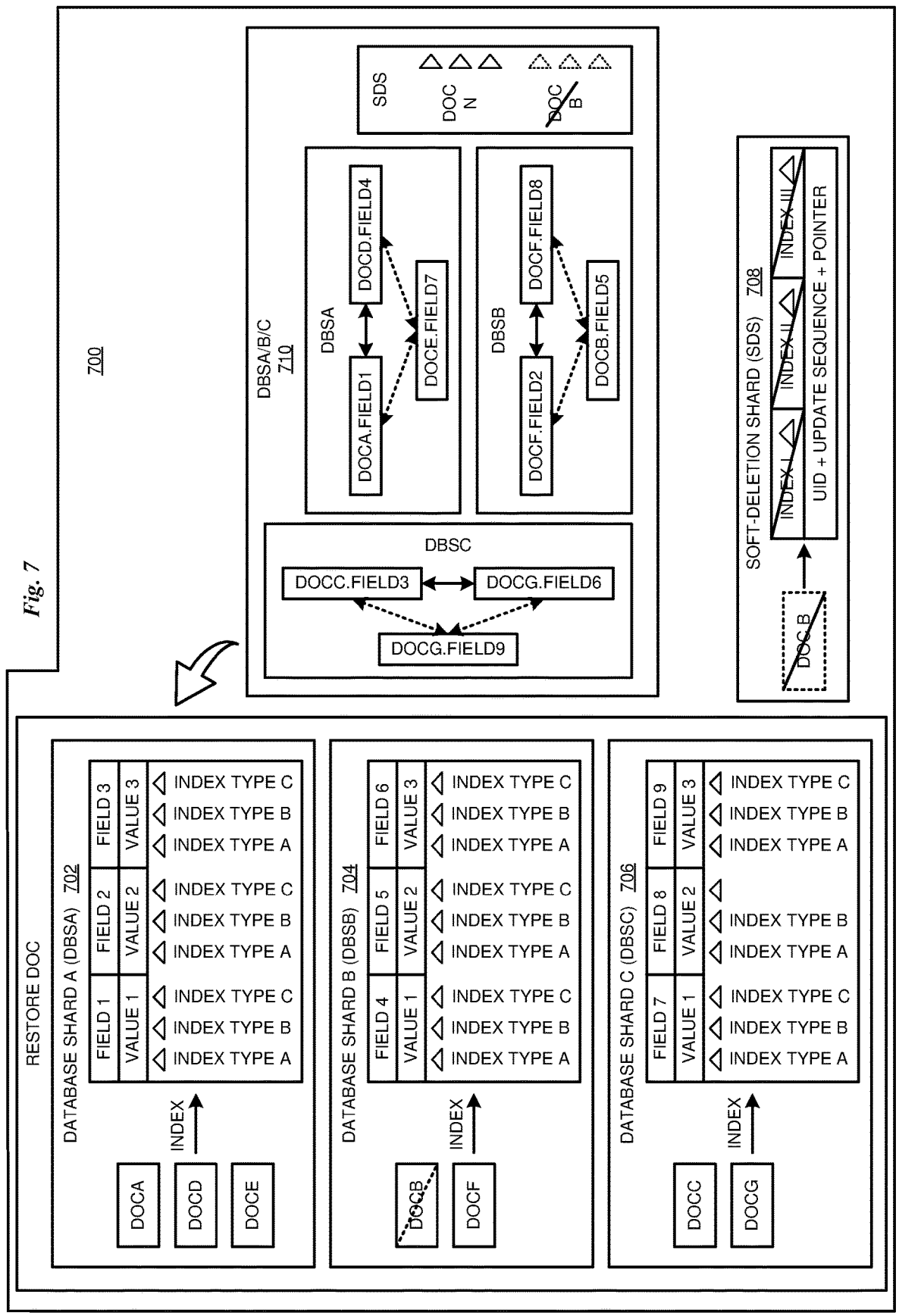
FIG. 7 depicts a block diagram of an example sharded database in accordance with an illustrative embodiment.

With reference to FIG. 7, this figure depicts a block diagram of an example sharded database 700 in accordance with an illustrative embodiment. More specifically, FIG. 7 shows the effect of a restore command for a previously soft-deleted document (DOCB). In a particular embodiment, sharded database 700 is an example of sharded database 500 of FIG. 5, sharded database 400 of FIG. 4, database 302 of FIG. 3, or database 109 of FIG. 1.

In the illustrated embodiment, the sharded database 700 includes three primary shards: database shard A (DBSA) 702, database shard B (DBSB) 704, and database shard C (DBSC) 706. In DBSB 704, the document DOCB is shown with a broken strikethrough, indicating that DOCB has been restored after having been previously soft deleted. However, the strikethrough of DOCB in DBSB 704 is only symbolic for explanatory purposes, as the actual document DOCB in the DBSB 704 3is not changed by a delete or restore command. Instead, the actual changes caused by the restore command are to the SDS 708. As a result of the restore command, the DOCB SDD and SDS indexes for the DOCB SDD are removed. Thus, future queries to the query manager 710 that return DOCB will include the DOCB in the pre-results and in the final results.

Figure 8:
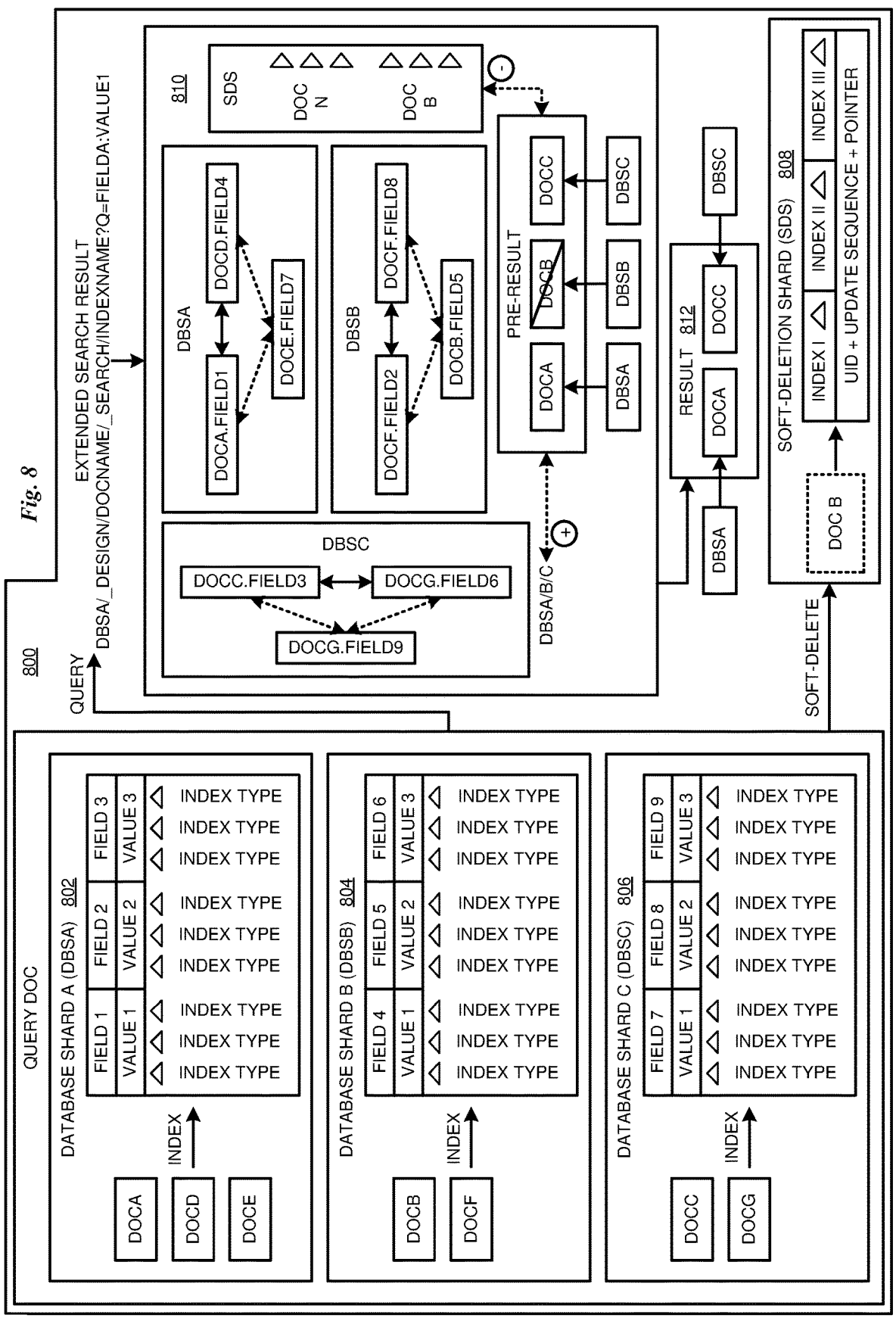
FIG. 8 depicts a block diagram of an example sharded database in accordance with an illustrative embodiment.

With reference to FIG. 8, this figure depicts a block diagram of an example sharded database 800 in accordance with an illustrative embodiment. More specifically, FIG. 8 shows the effect of a query command for a soft-deleted document (DOCB) in the sharded database 800. In a particular embodiment, sharded database 800 is an example of sharded database 500 of FIG. 5, sharded database 400 of FIG. 4, database 302 of FIG. 3, or database 109 of FIG. 1.

In the illustrated embodiment, the sharded database 800 includes three primary shards: database shard A (DBSA) 802, database shard B (DBSB) 804, and database shard C (DBSC) 806. In DBSB 804, the document DOCB is shown with a strikethrough indicating that DOCB has been soft deleted. However, the strikethrough of DOCB in DBSB 804 is only symbolic for explanatory purposes, as the actual document DOCB in the DBSB 804 is not changed by a delete or restore command. Thus, the SDS 808 includes an SDD for DOCB while DOCB is in a soft-deleted state. When the query manager 810 receives a query satisfied by DOCB, the DOCB is returned as a query result with other query results. However, since there is an SDD for DOCB in the SDS 808, the DOCB is removed while still in the pre-results. Thus, the final results 812 exclude the soft deleted document DOCB.

Figure 9:
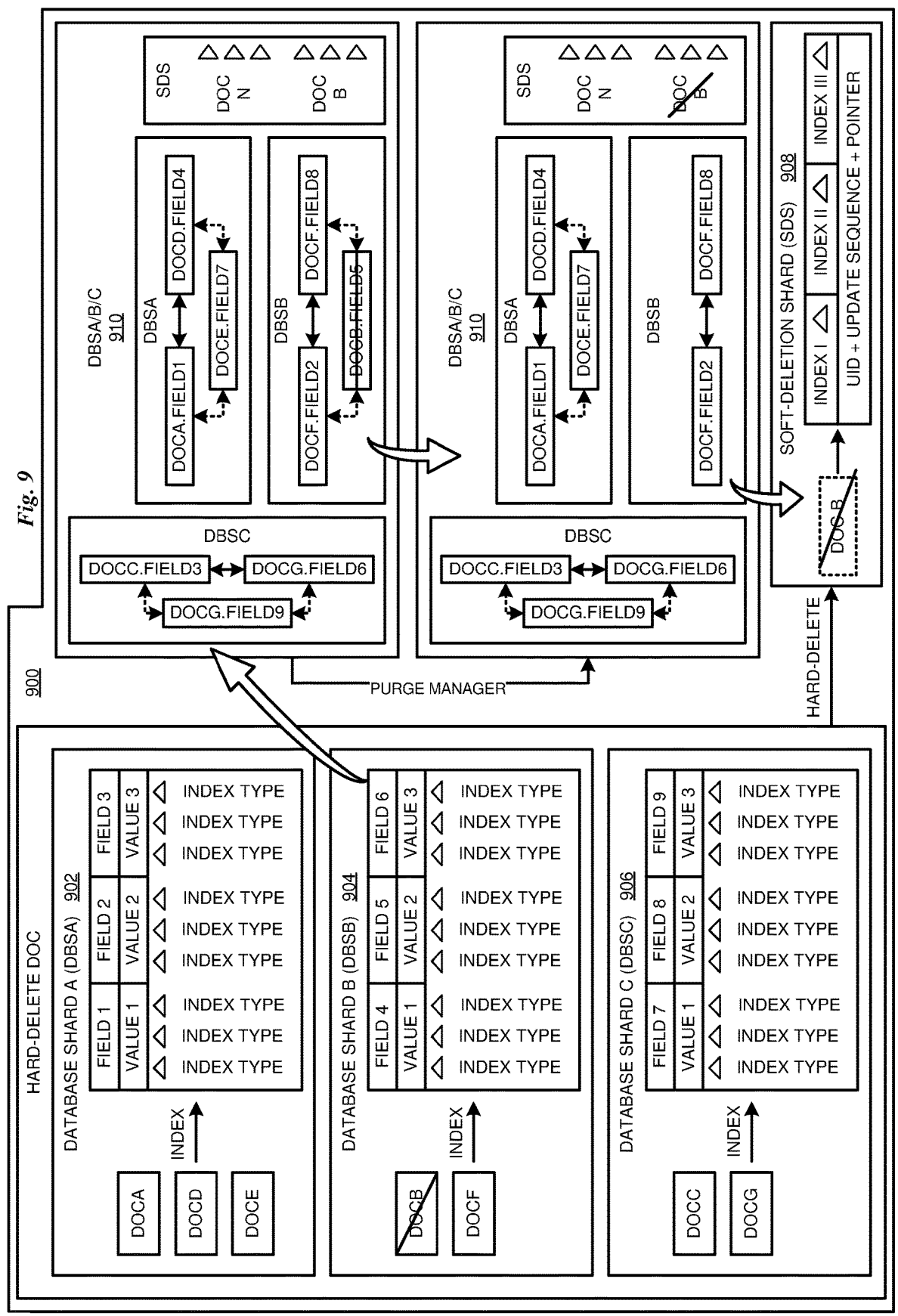
FIG. 9 depicts a block diagram of an example sharded database in accordance with an illustrative embodiment.

With reference to FIG. 9, this figure depicts a block diagram of an example sharded database 900 in accordance with an illustrative embodiment. More specifically, FIG. 9 shows the effect of a hard-delete or purging action for a previously soft-deleted document (DOCB). In a particular embodiment, sharded database 900 is an example of sharded database 500 of FIG. 5, sharded database 400 of FIG. 4, database 302 of FIG. 3, or database 109 of FIG. 1.

In the illustrated embodiment, the sharded database 900 includes three primary shards: database shard A (DBSA) 902, database shard B (DBSB) 904, and database shard C (DBSC) 906. In DBSB 904, the document DOCB is shown with a strikethrough, indicating that a purge manager 910 has permanently deleted DOCB after a prescribed retention period has passed since DOCB was soft deleted. Next, the purge manager 910 updates the index(es) of the primary shards to remove the reference to DOCB.FIELD5. Next, the purge manager 910 updates the soft-deletion indexes of the SDS 908. Finally, the purge manager 910 deletes the SDD from the SDS 908 that identifies the purged document DOCB.

Figure 10:
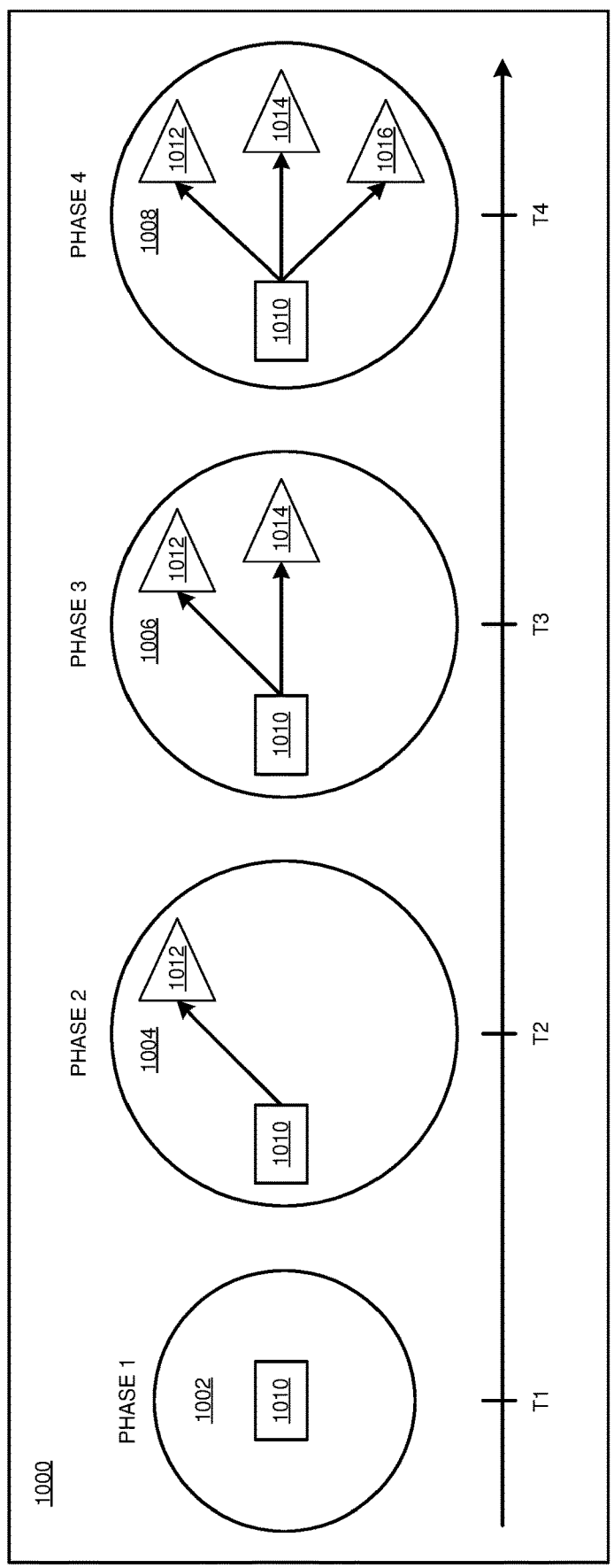
FIG. 10 depicts a block diagram of a timeline progression of an SDS index building process in accordance with an illustrative embodiment.

With reference to FIG. 10, this figure depicts a block diagram of a timeline progression of an SDS index building process in accordance with an illustrative embodiment. In a particular embodiment, the process shown in FIG. 10 is performed by index synchronizer 1010, which is an example of index synchronizer 426 of FIG. 4.

In an illustrative embodiment, the index synchronizer 1010 builds a plurality of SDS indexes 1012, 1014, and 1016 over a period of time spanning from T1 to T4 to support the efficient execution of queries of the SDS. If the SDS indexes 1012, 1014, and 1016 are not completed (i.e., prior to T4), the database must perform a full table scan, i.e., scan every document in the SDS to select SDDs that match the query statement. If the SDS indexes 1012, 1014, and 1016 are completed (i.e., after T4), the database uses the indexes 1012, 1014, and 1016 to limit the number of SDDs it will inspect to select SDDs that match the query statement.

In some embodiments, the index synchronizer 1010 builds multiple indexes for the SDS, where each index is a different index type. In the illustrated embodiment, the index synchronizer 1010 builds the indexes 1012, 1014, 1016 asynchronously. Starting at time T1, from index state 1002 the index synchronizer 1010 builds the SDS index 1012, which is completed at time T2 to complete index state 1004. At time T2, from index state 1004 the index synchronizer 1010 builds the SDS index 1014, which is completed at time T3 to complete index state 1006. At time T3, from index state 1006 the index synchronizer 1010 builds the SDS index 1016, which is completed at time T4 to complete index state 1008. In some embodiments, the index synchronizer 1010 builds the SDS indexes 1012, 1014, and 1016 to match the number and type of indexes present for the primary shards. This allows queries to the SDS to be consistent with queries to the primary shards.

Figure 11:
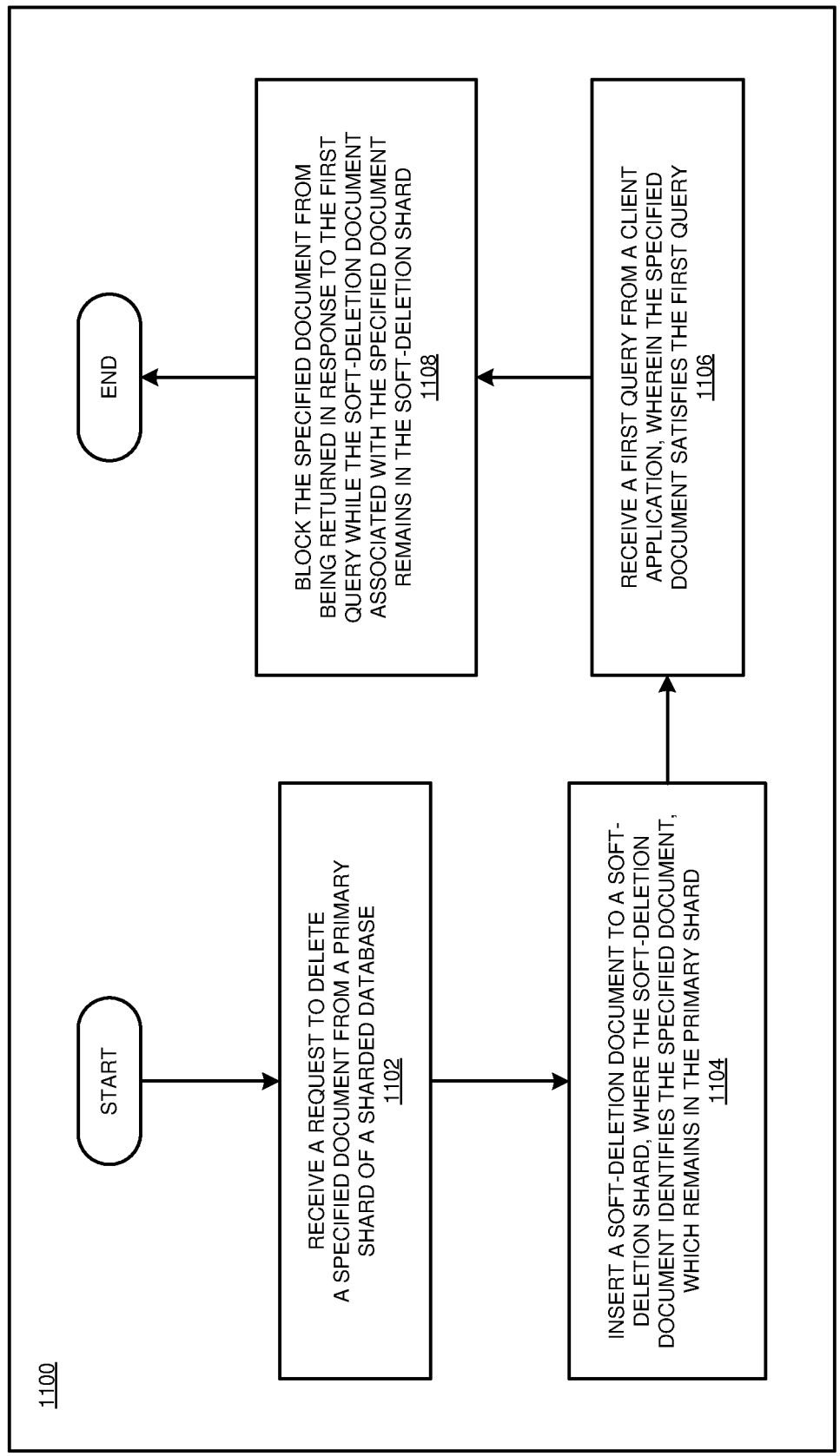
FIG. 11 depicts a flowchart of an example process for soft deletion of data in sharded databases in accordance with an illustrative embodiment.

With reference to FIG. 11, this figure depicts a flowchart of an example process 1100 for soft deletion of data in sharded databases in accordance with an illustrative embodiment. In some embodiments, the database 302, sharded database 400, sharded database 500, sharded database 600, sharded database 700, sharded database 800, or sharded database 900 carries out the process 1100.

In an embodiment, at block 1102, the process receives a request to delete a specified document from a primary shard of a sharded database. Next, at block 1104, the process inserts a soft-deletion document to a soft-deletion shard, wherein the soft-deletion document identifies the specified document, which remains in the primary shard. Next, at block 1106, the process receives a first query from a client application, wherein the specified document satisfies the first query. Next, at block 1108, the process blocks the specified document from being returned in response to the first query while the soft-deletion document associated with the specified document remains in the soft-deletion shard.

Figure 12A:
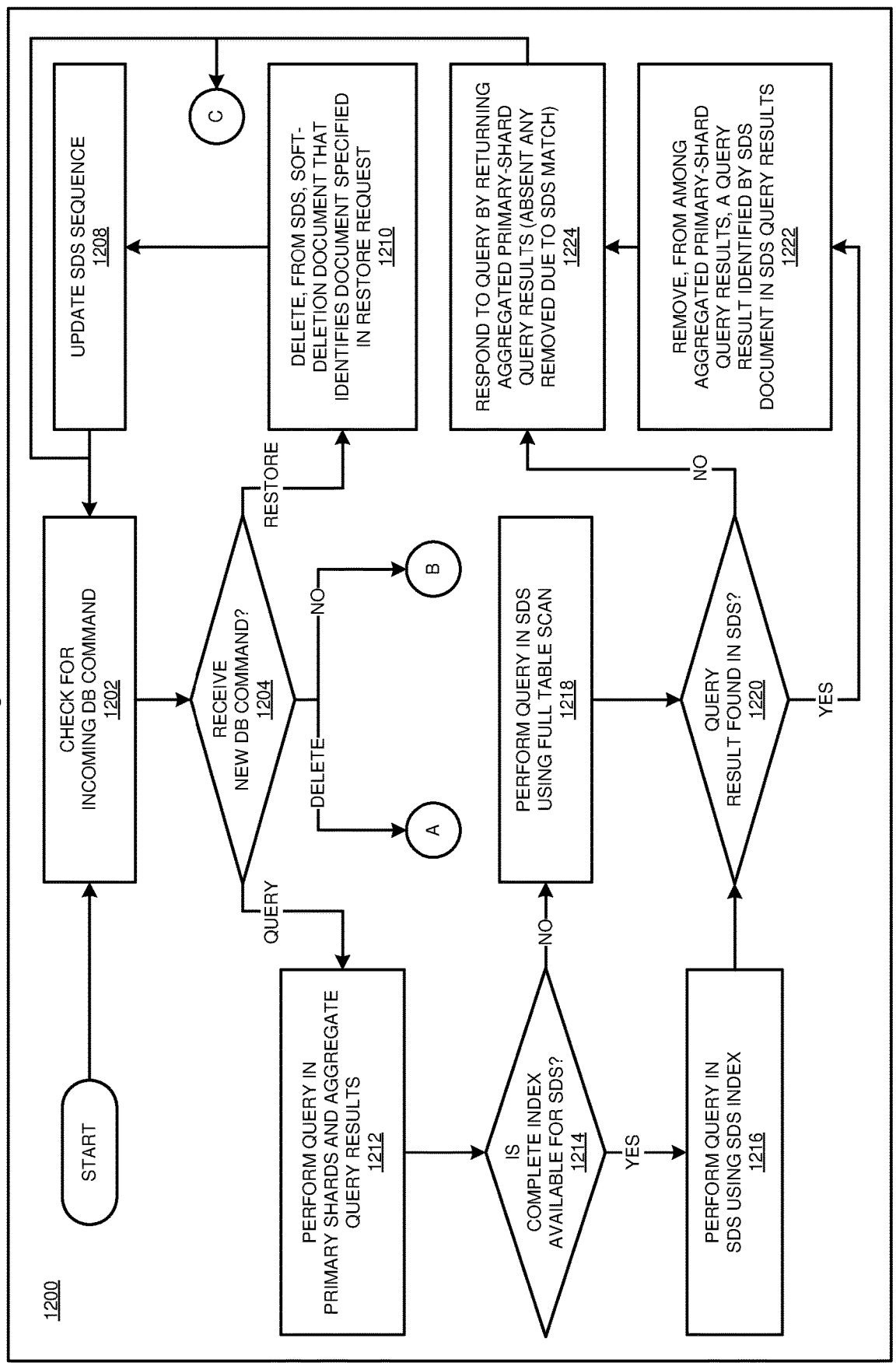
FIG. 12A depicts a first portion of a flowchart of an example process for soft deletion of data in sharded databases in accordance with an illustrative embodiment.
Figure 12B:
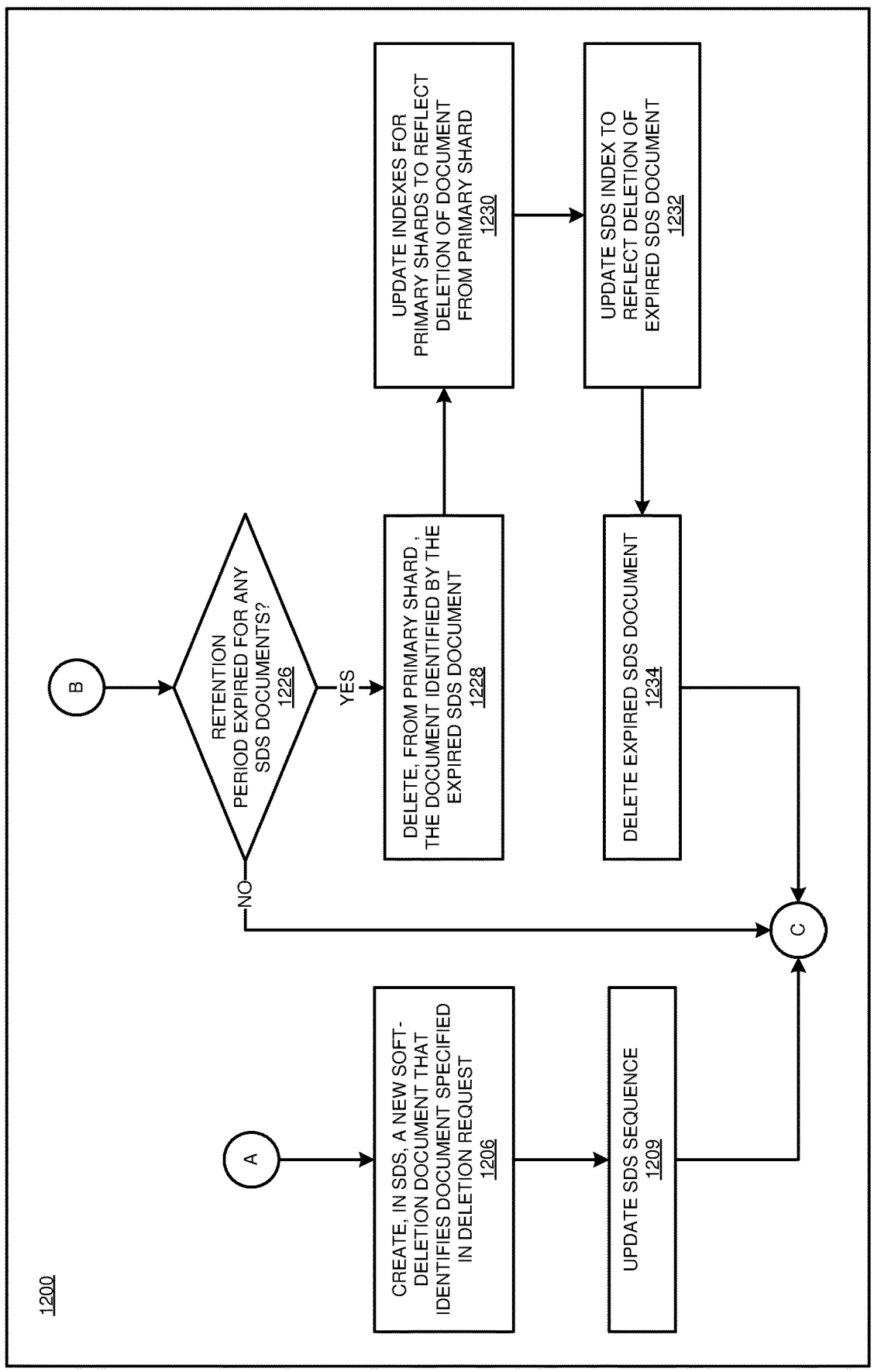
FIG. 12B depicts a second portion of a flowchart of an example process for soft deletion of data in sharded databases in accordance with an illustrative embodiment.

With reference to FIGS. 12A and 12B, these figures depict a flowchart of an example process 1200 for soft deletion of data in sharded databases in accordance with an illustrative embodiment. In some embodiments, the database 302, sharded database 400, sharded database 500, sharded database 600, sharded database 700, sharded database 800, or sharded database 900 carries out the process 1200.

In an embodiment, at block 1202, the process checks for an incoming database command. Next, at block 1204, if the process receives a delete command, the process continues to block 1206; if the process receives a restore command, the process continues to block 1210; if the process receives a query command, the process continues to block 1212; if the process receives no command, the process continues to block 1226.

If the process receives a delete command, then at block 1206 the process creates, in the soft-deletion shard, a new soft-deletion document that identifies the document specified by the delete command. Next, at block 1209, the process updates the soft-deletion shard sequence to reflect the newly added soft-deletion document.

If the process receives a restore command, then at block 1210 the process deletes, from the soft-deletion shard, the soft-deletion document that identifies the document specified in the restore request. Next, at block 1208, the process updates the soft-deletion shard sequence to reflect the newly-removed soft-deletion document.

If the process receives a query command, then at block 1212 the process performs a query in the primary shards and aggregates the query results. Next, at block 1214, the process determines if there is a complete index available for the soft-delete shard; if so, the process continues to block 1216, otherwise the process continues to block 1218. At block 1216, if the process determines that a complete index is available for the SDS, the process performs a query in the SDS using the SDS index. On the other hand, at block 1218, if the process determines that a complete index is not available for the SDS, the process performs the query in the SDS using a full table scan. At block 1220, the process determines whether the query at block 1216 or block 1218 returned a result. If so, the process continues to block 1222; otherwise the process continues to block 1224. At block 1222, since the same query is performed against the primary shards and the SDS, and since the documents in the SDS are essentially copies of documents from the primary shards that have be soft deleted, if a query matches a document from the SDS, then the query will also match a document from the primary shard that has been soft deleted. Therefore, at block 1222, the process removes, from among aggregated primary-shard query results, a query result identified by the SDS document that was returned as a query result. This action removes the soft-deleted document from the search results since the deleted document would not be expected to be included in the query results. Next, at block 1224, the process responds to the query by returning the aggregated primary-shard query results (absent any results removed due to an SDS match).

If the process receives no command, then at block 1226 the process checks whether the retention period has expired for any of the SDS documents. If so, then the process continues to perform blocks 1228, 1230, 1232, and 1234 for each SDS document for which the retention period has expired. In an embodiment, performing blocks 1228, 1230, 1232, and 1234 equates to a hard delete of a document from the sharded database. At block 1228, the process deletes, from the primary shard, the document identified by the expired SDS document. Next, at block 1230, the process updates indexes for the primary shards to reflect the deletion of the document from the primary shard. Next, at block 1232, the process updates the SDS index to reflect deletion of the expired SDS document. Finally, at block 1234, the process deletes the expired SDS document.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   receiving a request to delete a specified document from a location in a primary shard of a sharded database;
   inserting a soft-deletion document to a soft-deletion shard, wherein the soft-deletion document identifies the specified document in a separate location from the primary shard, the specified document remaining in the location in the primary shard;
   receiving a query from a client application, wherein the specified document satisfies the query; and
   blocking the specified document from being returned in response to the query while the soft-deletion document associated with the specified document remains in the soft-deletion shard.

2. The computer implemented method of claim 1, wherein the sharded database is a NoSQL database.

3. The computer implemented method of claim 1, further comprising:
   receiving a restore request to restore the specified document to the sharded database; and
   restoring, responsive to the restore request, the specified document to the sharded database, wherein the restoring includes removing the soft-deletion document from the soft-deletion shard.

4. The computer implemented method of claim 1, wherein the soft-deletion document includes a unique identifier (UID) of the specified document and a pointer that refers to the specified document.

5. The computer implemented method of claim 4, further comprising:
   executing the query against a primary data shard.

6. The computer implemented method of claim 5, further comprising:
   executing the query against the soft-deletion shard; and
   identifying a soft-deleted search result by detecting that the soft-deletion document being returned from the query against the soft-deletion shard matches the specified document being returned from the query against the primary data shard.

7. The computer implemented method of claim 6, wherein the identifying of the soft-deleted search result comprises:
   detecting that the UID of the soft-deletion document being returned from the query against the soft-deletion shard matches the UID of the specified document being returned from the query against the primary data shard.

8. The computer implemented method of claim 6, further comprising:
   removing, responsive to identifying the soft-deleted search result, the specified document from being returned from the query against the primary data shard.

9. The computer implemented method of claim 5, further comprising:
   building, responsive to the inserting of the soft-deletion document to the soft-deletion shard, a soft-deletion index of the soft-deletion shard for the soft-deletion document.

10. The computer implemented method of claim 9, further comprising:
    determining, responsive to receiving the query, that the soft-deletion index is incomplete; and
    executing, responsive to determining that the soft-deletion index is incomplete, the query against the soft-deletion shard using a full table scan.

11. The computer implemented method of claim 10, further comprising:
    determining, responsive to receiving the query, that the soft-deletion index is complete; and
    executing, responsive to determining that the soft-deletion index is complete, the query against the soft-deletion shard using the soft-deletion index.

12. The computer implemented method of claim 1, further comprising:
    detecting that an amount of time since receiving the request to delete the specified document has reached a prescribed retention period; and
    performing a hard deletion process for purging the specified document from the sharded database.

13. The computer implemented method of claim 12, wherein the hard deletion process comprises:
    deleting the specified document from the primary shard of the sharded database;
    updating an index of the primary shard to reflect deletion of the specified document from the primary shard;
    updating a soft-deletion index of the soft-deletion shard to reflect deletion of the soft-deletion document from the soft-deletion shard; and
    deleting the soft-deletion document from the soft-deletion shard.

14. A computer program product comprising one or more computer readable storage media, and program instructions collectively stored on the one or more computer readable storage media, the program instructions executable by a processor to cause the processor to perform operations comprising:
    receiving a request to delete a specified document from a location in a primary shard of a sharded database;
    inserting a soft-deletion document to a soft-deletion shard, wherein the soft-deletion document identifies the specified document in a separate location from the primary shard, the specified document remaining in the location in the primary shard;
    receiving a query from a client application, wherein the specified document satisfies the query; and
    blocking the specified document from being returned in response to the query while the soft-deletion document associated with the specified document remains in the soft-deletion shard.

15. The computer program product of claim 14, wherein the stored program instructions are stored in a computer readable storage device in a data processing system, and wherein the stored program instructions are transferred over a network from a remote data processing system.

16. The computer program product of claim 14, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
- program instructions to meter use of the program instructions associated with the request; and
- program instructions to generate an invoice based on the metered use.

17. The computer program product of claim 14, further comprising:
- receiving a restore request to restore the specified document to the sharded database; and
- restoring, responsive to the restore request, the specified document to the sharded database, wherein the restoring includes removing the soft-deletion document from the soft-deletion shard.

18. The computer program product of claim 14, further comprising:
- executing the query against a primary data shard;
- executing the query against the soft-deletion shard; and
- identifying a soft-deleted search result by detecting that the soft-deletion document being returned from the query against the soft-deletion shard matches the specified document being returned from the query against the primary data shard.

19. A computer system comprising a processor and one or more computer readable storage media, and program instructions collectively stored on the one or more computer readable storage media, the program instructions executable by the processor to cause the processor to perform operations comprising:
- receiving a request to delete a specified document from a location in a primary shard of a sharded database;
- inserting a soft-deletion document to a soft-deletion shard, wherein the soft-deletion document identifies the specified document in a separate location from the primary shard, the specified document remaining in the location in the primary shard;
- receiving a query from a client application, wherein the specified document satisfies the query; and
- blocking the specified document from being returned in response to the query while the soft-deletion document associated with the specified document remains in the soft-deletion shard.

20. The computer system of claim 19, further comprising:
- receiving a restore request to restore the specified document to the sharded database; and
- restoring, responsive to the restore request, the specified document to the sharded database, wherein the restoring includes removing the soft-deletion document from the soft- deletion shard.

* * * * *